United States Patent [19]

Stanford

[11] 4,205,825
[45] Jun. 3, 1980

[54] JACK FOR SNOW PLOW FRAMES

[76] Inventor: George H. Stanford, Box 669, North Windham, Me. 04062

[21] Appl. No.: 36,560

[22] Filed: May 7, 1979

[51] Int. Cl.² ................................................ B66F 9/04
[52] U.S. Cl. ................................................ 254/86 R
[58] Field of Search ............... 280/475, 465, 470, 763, 280/764; 414/686, 553, 438; 254/45, 86 R, 100

[56] References Cited

U.S. PATENT DOCUMENTS

| 2,672,318 | 3/1954 | Lee | 254/86 R |
| 3,405,955 | 10/1968 | Schuler | 280/475 |
| 3,805,980 | 4/1974 | Kisaka | 414/686 |

Primary Examiner—Robert C. Watson

[57] ABSTRACT

A jack for snow plow frames is attachable thereto forwardly of the ears of the frame through which and corresponding ears on the front end of a truck attaching pivot pins extend when the pin receiving holes in the ears are in registry. A jack unit attachable to a snow plow frame has transverse arms attachable to the frame and a central hub through which a jack screw is threaded at right angles to the arms and which is rotatable relative to the frame to enable the jack screw to be swung into and out of a ground-engaging vertical position and adjusted to maintain the frame in the position it was in while the plow was being disconnected from the truck and to be raised and lowered, if necessary when the plow is again to be connected to the plow frame.

2 Claims, 3 Drawing Figures

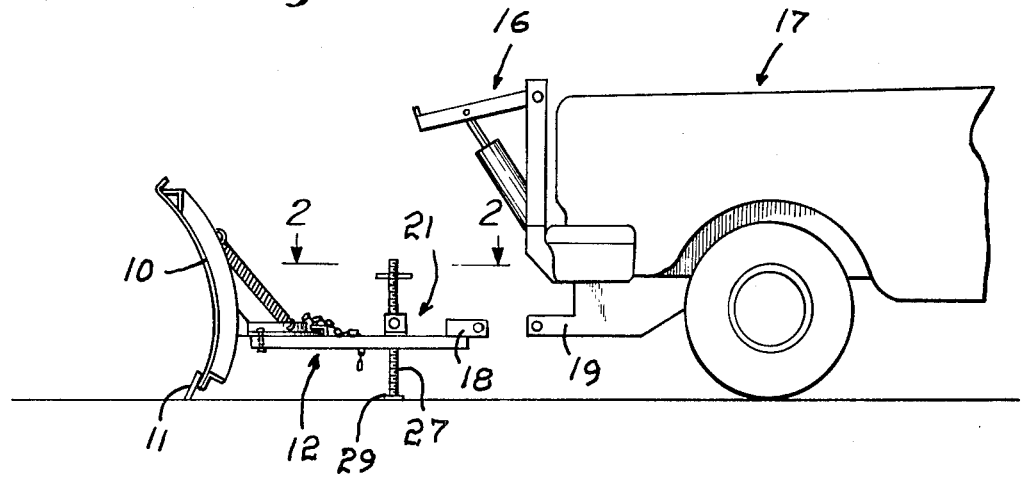
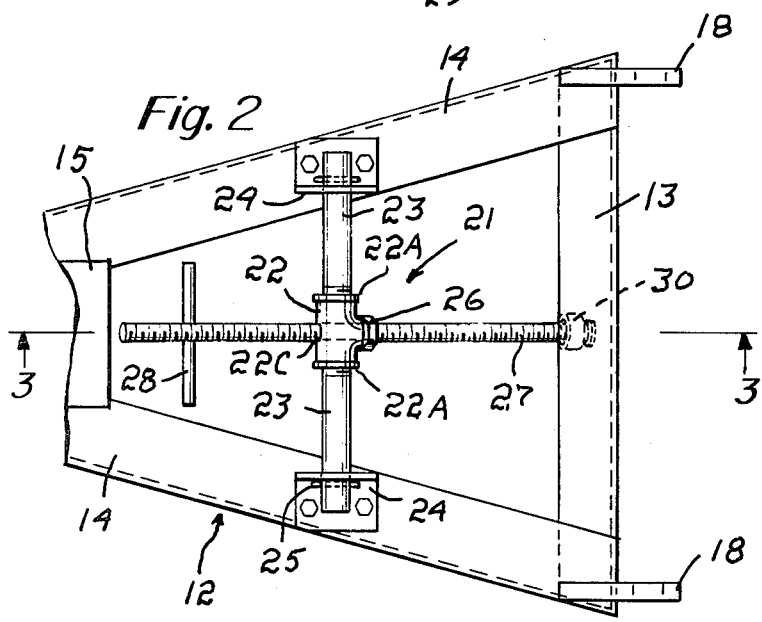
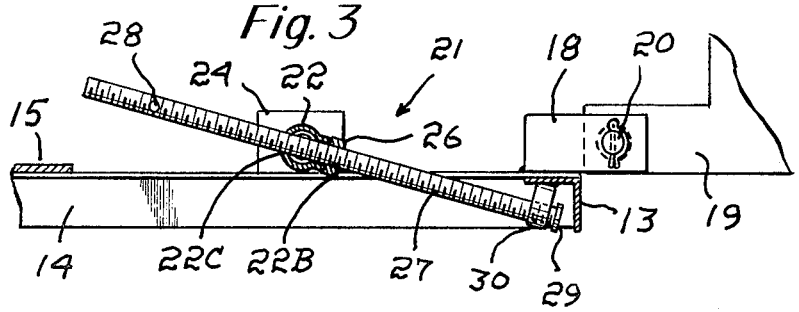

JACK FOR SNOW PLOW FRAMES

Background References

U.S. Pat. No. 3,987,562;
U.S. Pat. No. 3,527,370;
U.S. Pat. No. 3,150,884.

Background of the Invention

Snow Plows for vehicles have rearwardly disposed frames which have spaced, reawardly exposed parts which are detachably connected by pins to appropriately spaced parts secured to the front of the truck and each exposed to enable an appropriate plow frame part to be pinned thereto when in a predetermined position.

When a plow is no longer needed, it is a common practice to place blocks under the rear part of the truck frame to hold it at the correct height before disconnecting the plow frame. The plow is usually not again needed until during and after another snow storm and then, the snow cover commonly results in the connecting parts exposed at the front of the truck being too high making the reconnection of the plow to the truck difficult and time consuming.

I am aware that stands have been proposed to hold detached plows with their frames positioned as they were when truck attached, but as far as I am aware, no provision has ever been made to enable a frame of a disconnected plow to be raised or lowered by a jack incorporated in the frame to enable the plow frame parts to be brought quickly and easily into positions enabling them to be connected through pins to the corresponding parts of the truck.

The Present Invention

The general objective of the present invention is to provide a jack attachable to the push frame of a snow plow as a permanent part thereof and operable not only to support the frame at the proper height before being disconnected from the truck but also to adjust the height of the frame as may be required to enable the frame to be reconnected to the truck.

In accordance with the invention this objective is attained with a jack unit provided with a hub connected by transverse arms to the forwardly and inwardly inclined frame members with the hub between them and rotatable about a horizontal axis, desirably but not necessarily with the arms connected to the frame members to enable them to be rotated. A jack screw is threaded through the hub so that it may be swung from an inoperative position into and out of its operative vertical position then to be advanced into contact with the ground to hold the frame of the plow at the wanted height once it is disconnected from the truck and thereafter turned in one direction or the other to readjust the frame height, if necessary, to enable it easily to be again connected to the truck.

Brief Description of the Drawings

The accompanying drawings illustrate the preferred embodiment of the invention with FIG. 1 a side view of a typical snow plow with the means somewhat schematically shown by which its frame is connected to a truck;

FIG. 2 a section, on a substantial increase in scale, taken approximately along the indicated line 2—2 of FIG. 1; and FIG. 3 is a section taken approximately along the indicated line 3—3 of FIG. 2 on a substantial increase in scale.

The Preferred Embodiment of the Invention

A snow plow includes a mold board 10 provided with a hinged scraper blade 11 and a frame generally indicated at 12. As such snow plows and the means by which they are detachably connected to trucks are well known and their constructions vary somewhat from manufacturer-to-manufacturer, only those parts, essential to an appreciation of the invention are detailed and are shown in their simplest form.

The frame 12 includes a push bar 13 and forwardly and inclined members 14 each connected to the push bar adjacent the appropriate one of the ends thereof with their forward ends joined by a plate 15. The frame 12 is attachable by a chain, not shown, to a hoist, generally indicated at 16, mounted on the front of a truck 17.

Adjacent each end of the push bar 13 there is a rearwardly disposed ear 18 which, when aligned with the hole in the appropriate one of the two hangers 19 fixed in forward portions of the truck frame enable pivot pins 20 to be inserted through the ears and hangers and then secured thus to connect the frame 12 to the truck and enable the plow to be raised or lowered by means of the hoist 16.

The connection of the frame to the truck requires that the ears 18 and hangers 19 be so positioned as to receive the pins 20. In order to facilitate pin insertion and removal, the frame 12 is provided with a jack unit, generally indicated at 21.

The jack unit 21 includes a hub 22 in the form of a T having an arm 23 threaded in each of the transversely aligned hub openings 22A. The outer end of each arm 23 extends freely through one wall of a bracket 24 secured to the appropriate one of the frame members 14 and held in place as by a cotter pin 25. The type and location of the arm-holding brackets depending on the frame construction and in the disclosed embodiment, the brackets 24 are right angular with their other walls welded or belted to the upper surfaces of the frame members 14.

The other opening 22B of the hub 22 has a nut 26 welded thereto and the hub 22 has a bore 22C in alignment therewith and dimensioned freely to receive the jack screw 27 threaded through the nut 26. A rod 28 extending transversely through the upper or outer end of the jack screw 27 establishes a handle for use in turning the jack screw in one direction or the other. The inner or lower end of the jack screw is provided with a ground engaging disc 29 and extends freely through a keeper 30 shown as welded on the undersurface of the push bar 13 until the jack unit is needed to support the frame 12.

When the jack unit 21 is used, the jack screw 27 is rotated to free it from the keeper 30 so that it may be swung until it is vertical. Assuming the frame 12 to be connected to the truck, the jack screw is then turned until the disc 29 is seated on the ground enabling the pivot pins 20 to be easily withdrawn to release the frame 12 and to hold the frame 12 in the position it was when connected to the truck with the scraper blade 11 resting on the ground.

When the plow is again to be used, the truck is driven into the position that brings each hanger 19 into that relationship with the appropriate one of the ears 18 that enables the pivot pins 20 again to couple the frame 12 to the truck unless a height difference then exists due, for example, to an added snow cover. In that case, the jack screw 27 is turned to raise the frame 12 to the necessary extent and after the frame is coupled to the truck, the jack screw 27 is turned in the opposite direction to enable it to be swung into its inoperative position and then again advanced until held by the keeper 30.

I claim:

1. A jack unit for attachment to the frame of a snow plow, the frame having transversely spaced ears to be coupled by pivot pins to hangers mounted on the front end of a truck, said jack unit including supporting arms, brackets attachable to said plow frame and in support of said arms, said arms then supported transversely of said frame, and a central hub, said hub having a threaded bore the axis of which is at right angles to said arms, and a jack screw threaded through said hub bore, said hub rotatable relative to said brackets when attached to said frame to enable said jack screw to be swung into and out of a ground-engaging frame supporting position from and into an inoperative position and operable by being turned in one direction or the other to support the frame in the position enabling said pivot pins to be moved to disconnect the frame from the hanger or to reconnect the frame thereto and also to be turned to readjust the height of the frame ears if necessary to permit such reconnection, and means attachable to said frame in a position enabling an end of the jack screw to be turned to enter therein to hold the jack screw in an inoperative position or to be retracted therefrom.

2. The jack unit of claim 1 in which said jack end is the ground-engaging end.

* * * * *